US010079502B2

(12) United States Patent
Zosimadis et al.

(10) Patent No.: US 10,079,502 B2
(45) Date of Patent: Sep. 18, 2018

(54) POWER MANAGEMENT SYSTEM FOR DISPENSERS

(71) Applicant: Smart Wave Technologies, Inc., Bethesda, MD (US)

(72) Inventors: Peter Zosimadis, Toronto (CA); Paul Waterhouse, Selkirk (CA)

(73) Assignee: Smart Wave Technologies, Inc., Bethesda, MD (US)

( * ) Notice: Subject to any disclaimer, the term of this patent is extended or adjusted under 35 U.S.C. 154(b) by 327 days.

(21) Appl. No.: 14/736,349

(22) Filed: Jun. 11, 2015

(65) Prior Publication Data

US 2015/0280441 A1  Oct. 1, 2015

Related U.S. Application Data

(63) Continuation of application No. PCT/CA2013/001039, filed on Dec. 11, 2013.

(Continued)

(51) Int. Cl.
*G01R 1/20* (2006.01)
*H02J 7/02* (2016.01)
(Continued)

(52) U.S. Cl.
CPC ............ *H02J 7/02* (2013.01); *A47K 5/12* (2013.01); *H02J 7/0054* (2013.01);
(Continued)

(58) Field of Classification Search
CPC .. Y10T 307/707; Y10T 307/469; H02J 17/00; H02J 5/00; H02J 5/05
(Continued)

(56) References Cited

U.S. PATENT DOCUMENTS 4,722,372 A  2/1988  Hoffman et al.
5,006,780 A *  4/1991  Tamura ................ H02J 7/022
                                                320/128

(Continued)

FOREIGN PATENT DOCUMENTS

WO  2005120782 A2  12/2005
WO  2009146287 A1  12/2009

OTHER PUBLICATIONS

Transmittal of the International Search Report and Written Opinion of the International Searching Authority Application No. PCT/CA2013/001039 Completed: Mar. 11, 2014; dated Mar. 12, 2014 6 pages.

(Continued)

*Primary Examiner* — Patrick Chen
(74) *Attorney, Agent, or Firm* — Whitmyer IP Group LLC

(57) ABSTRACT

A power management system for dispensers is described. The system includes a controller connected to a lower power zero net voltage (ZNV) power source. A power rectification circuit (PRC) converts ZNV power to higher voltage direct current (HVDC) power. An energy storage system connected to the HVDC power source receives and stores HVDC power within the energy storage system which is selectively provided to a dispenser motor load connected to the energy storage system. The system provides an effective solution to the problem of transferring power from a low power battery source on a disposable product to a dispenser as well as providing a system that minimizes corrosion at the electrical interface between the disposable product and the dispenser particularly in higher humidity environments.

21 Claims, 10 Drawing Sheets

Related U.S. Application Data

(60) Provisional application No. 61/735,927, filed on Dec. 11, 2012.

(51) Int. Cl.
*A47K 5/12* (2006.01)
*H02J 7/00* (2006.01)
*H02J 7/34* (2006.01)
*A47K 10/36* (2006.01)
*H02J 1/00* (2006.01)

(52) U.S. Cl.
CPC ............ *H02J 7/0068* (2013.01); *H02J 7/345* (2013.01); *A47K 10/36* (2013.01); *A47K 10/3625* (2013.01); *H02J 2001/002* (2013.01)

(58) Field of Classification Search
USPC ........................................................ 307/154
See application file for complete search history.

(56) References Cited

U.S. PATENT DOCUMENTS

| | | | |
|---|---|---|---|
| 5,379,917 A | 1/1995 | Brown et al. | |
| 5,908,140 A | 6/1999 | Muderlak et al. | |
| 6,209,752 B1 | 4/2001 | Mitchell et al. | |
| 6,275,143 B1 | 8/2001 | Stobbe | |
| 6,977,588 B2 | 12/2005 | Schotz et al. | |
| 7,015,664 B2 | 3/2006 | Coles et al. | |
| 7,028,861 B2 | 4/2006 | Sayers et al. | |
| 7,296,765 B2 | 11/2007 | Rodrian | |
| 7,533,787 B2 | 5/2009 | Muderlak et al. | |
| 7,621,426 B2 | 11/2009 | Reynolds et al. | |
| 8,074,836 B2 | 12/2011 | Reynolds et al. | |
| 8,096,445 B2 | 1/2012 | Yang et al. | |
| 8,109,411 B2 | 2/2012 | Yang et al. | |
| 8,167,168 B2 | 5/2012 | Reynolds | |
| 8,994,335 B2 * | 3/2015 | Tagami .................. | H02J 7/0024 320/118 |
| 2011/0241624 A1 * | 10/2011 | Park ...................... | H02J 7/0052 320/134 |
| 2011/0320109 A1 * | 12/2011 | Polimeno .............. | B60L 3/0092 701/113 |
| 2012/0133213 A1 * | 5/2012 | Borke ..................... | H02J 17/00 307/104 |
| 2012/0241470 A1 | 9/2012 | Snodgrass et al. | |
| 2012/0274154 A1 * | 11/2012 | DeLuca .................. | H02J 17/00 307/149 |

OTHER PUBLICATIONS

International Search Report Application No. PCT/CA2013/001039 Completed: Jan. 28, 2014; dated Mar. 12, 2014 3 pages.
Extended European International Search Report Application No. 13862438.2 Completed: Jul. 22, 2016 dated Aug. 1, 2016 8 Pages.
European Examination Report Application No. 13862438.2 dated Jun. 9, 2017 5 Pages.

* cited by examiner

POWER MANAGEMENT SYSTEM FOR DISPENSERS

FIELD OF THE INVENTION

A power management system for dispensers is described. The system includes a controller connected to a lower power zero net voltage (ZNV) power source. A power rectification circuit (PRC) converts ZNV power to higher voltage direct current (HVDC) power. An energy storage system connected to the HVDC power source receives and stores HVDC power within the energy storage system which is selectively provided to a dispenser motor load connected to the energy storage system. The system provides an effective solution to the problem of transferring power from a low power battery source on a disposable product to a dispenser as well as providing a system that minimizes corrosion at the electrical interface between the disposable product and the dispenser particularly in higher humidity environments.

BACKGROUND OF THE INVENTION

Dispensing systems for products such as soap, air care, and paper towels are widely used in millions of private and public washroom facilities around the world. As is well known, such systems can be manual, semi-automatic or automatic systems that require different types of user-interaction with the systems to dispense soap or paper towels. A manual system typically requires a user to physically displace a button, crank arm or the like to move mechanical components to dispense the material, a semi-automatic system may require a user to touch a button to initiate electrical activation of mechanical components and an automatic system may detect the presence of a user to initiate electrical activation of mechanical components.

Increasingly, from a public health perspective, there is a desire to increase the deployment of semi-automatic and preferably fully-automatic dispensing systems in public washroom facilities, primarily to reduce or minimize physical user contact with the dispensing equipment and thereby reduce the risk of spreading of pathogens between users.

However, semi-automatic and automatic dispensing systems provide issues to property owners and managers particularly for those owners or managers of large buildings or facilities that may have hundreds or thousands of washrooms within their properties. In particular, as is well known, dispensing systems require that the consumable product, for example, a paper towel product or a liquid soap product must be replaced on a regular basis as the product is consumed. As such, the property owners/managers will employ substantial numbers of people who are responsible for replenishing the consumable product within the dispenser.

In the case of semi-automatic and automatic dispensing systems, most of these dispensers utilize a single or multiple batteries to provide the energy to complete a dispensing cycle. In most designs, the rate of consumption of the consumable product is substantially greater than the power consumption rate within the batteries. That is, the paper towels within a dispenser may have to be replaced several times a day whereas in many designs, the batteries in the dispenser may only have to be changed on a monthly time scale. However, different washrooms may have substantially different usage rates, such that the batteries in one washroom may expire more rapidly than those in a nearby washroom. As a result, it is often very difficult to efficiently react to expired batteries across a number of washrooms as over time, the expiry of batteries in dispensers become essentially random events. Importantly, if batteries are not replaced when needed, users often become frustrated with the dispensing equipment and may end up either touching a number of surfaces of the equipment which must thereafter be cleaned or worse, inflicting damage to the dispenser. In addition, the manufacturer of the consumable is also losing revenue due to the inoperative dispensing equipment not dispensing the consumable product.

Each of these factors can have an affect on the adoption and use of these types of dispensers where consumers may in fact learn to avoid certain types of dispensers based on their previous experiences of interacting with a particular type of dispenser. As a result, improvements in the reliability of a dispenser can have significant effects on the adoption and use of such products.

Further still, in large properties, such as a hospital or an airport, the time required to replace batteries is substantial. In many dispensers, in order to replace the batteries, a significant number of steps must be taken to remove the expired batteries and replace them. For example, battery compartments often require additional keys or steps to specifically remove and replace the batteries than the relatively simpler steps of replacing a consumable. As can be appreciated, there are significant costs in terms of personnel having to both recognize and react to an inoperative dispenser.

One solution to these problems is to incorporate a battery into the consumable product either as a separate component or as an integral component of its packaging. As a separate component, each package of consumable product would include a battery thus making the battery available to be replaced each time the consumable is replaced. As described in U.S. Pat. No. 6,209,752, a battery can form an integral component of the consumable packaging wherein the user replaces both the consumable and the battery simply by inserting new consumable packaging within the dispenser. That is, every time a consumable product is replaced within a dispenser, the dispenser receives a new battery to operate the dispenser. Typically, in these designs, the consumable product packaging has two electrodes that frictionally connect to corresponding electrodes on the dispenser such that power is transferable from the consumable product packaging to the controller/drive system of the dispenser.

While overcoming a number of problems as described above in regards to matching different servicing schedules between consumables and batteries, one particular problem arising from this technology is the potential for electrode corrosion particularly when both the dispenser and refill are stationary such as within an air care or soap dispenser product. That is, as today's dispensing equipment are typically low voltage and direct current devices that are usually installed in the relatively humid environment of a washroom, these conditions are known to encourage metal migration, galvanic corrosion and/or cause corrosion or resistance build up between the contacts. As the resistance between electrical contacts increases, the efficiency of the system decreases which may cause systems performance to decrease and/or fail prematurely. In other words, while overcoming one problem of efficiently changing batteries, this technology can produce other problems in dispensing systems. Thus, there has been a need for a power system that combines a battery with the consumable product but that does not lead to electrode corrosion.

In another aspect, there continues to be a need for companies that manufacture dispensing systems to protect their investments in the design of their dispensers by preventing the use of other manufacturer's consumable products within their dispensers. That is, as is known, when a manufacturer commercializes a dispenser, such dispensers are typically sold at a relatively low cost based on the expectation that the subsequent sales of consumables to a customer will provide the ongoing revenue/profit to underwrite the cost of developing the dispenser. As a result, there continues to be a need for systems that efficiently prevent the use of unauthorized consumable products within a dispensing system and that provide effective keying between a consumable product and a dispenser.

Further still, there has been a need for systems that more effectively manage power within the systems. More specifically, as noted above, while a power cell (eg. a battery) can be incorporated into a consumable product as described above, there has been a need to minimize the amount of power that may be wasted in a battery that is within a consumable product.

For example, there has been a need to ensure that when a consumable product such as a soap cartridge is fully used, that the battery associated within that cartridge is effectively depleted at the same time such that when the battery is disposed, it is in a depleted state. That is, it is not desirable to discard a battery when the battery has only been fractionally depleted.

Further still, there has been a need to eliminate or reduce the need for serviceable batteries within a dispenser and provide a system where power can be effectively transferred between different locations within in a dispensing system in an efficient manner. That is, it is desirable to have a system that effectively eliminates the need for operator involvement with a dispenser itself in regards to its power requirements.

Further still, there has been a need for an energy management system that minimizes delays in activation from the time a user approaches a dispenser and the time it takes for the product to be dispensed. That is, as is well known if an automatic or semi-automatic dispenser does not initiate dispensing of a product within approximately 0.2-0.3 seconds, the consumer will typically react to this delay as an indicator of possible non-operability of the dispenser and which may then lead to frustrated or improper interaction with the dispenser.

Further still, there has been a need for an energy system that can quickly enable a low voltage/low current power source within the consumable to be conditioned such that it can be effectively utilized within higher current motors within a dispensing system.

Further still, there has also been a need to be able to capture stray energy within a dispensing system to improve the overall energy management efficiency. As well, there has been a need to reduce the environmental impact of disposal of larger batteries and reduce the amount of wasted energy that may be thrown away when consumable products may have been depleted.

SUMMARY OF THE INVENTION

In accordance with the invention, there is provided a system for managing power delivery to a dispenser, the system comprising: a controller operatively connected to a lower power zero net voltage (ZNV) power source, the controller having a power rectification circuit (PRC) for converting the ZNV power source to a higher voltage direct current (HVDC) power source; at least one energy storage system operatively connected to the HVDC power source for receiving and storing HVDC power within the at least one energy storage system; and, a dispenser load operatively connected to the at least one energy storage system.

In one embodiment, the controller includes means for selectively directing HVDC power to the at least one energy storage system to charge the at least one energy storage system and means for selectively directing power from the at least one energy storage system to the dispenser load based on load demand.

In one embodiment, the energy storage system includes at least one capacitor.

In another embodiment, the system includes an auxiliary power cell operatively connected to the HVDC power source for receiving and storing HVDC power within the auxiliary power cell and wherein the controller includes means for selectively directing HVDC power to each of the at least one capacitor and auxiliary power cell to charge the at least one capacitor and auxiliary power cell and means for selectively directing power from the at least one capacitor and auxiliary power cell to the dispenser load based on load demand.

In one embodiment, the controller prioritizes power to the dispenser load from the at least one capacitor ahead of the auxiliary power cell.

In one embodiment, the controller includes at least one switch operatively connected between the at least one capacitor and auxiliary power cell for selectively directing power to either the at least one capacitor or auxiliary power cell to charge either the at least one capacitor or auxiliary power cell.

In another embodiment, the controller includes voltage measuring means operatively connected to the at least one capacitor and auxiliary power cell for measuring the voltage of the at least one capacitor and auxiliary power cell and wherein the controller prioritizes power delivery from the HVDC power source to the at least one capacitor or auxiliary power cell based on actual measured voltage of the at least one capacitor and auxiliary power cell.

In another embodiment, the controller prioritizes power delivery from the at least one capacitor and auxiliary power cell to the dispenser load based on actual measured voltage of the at least one capacitor and auxiliary power cell.

In one embodiment, when there is no dispenser load demand, the controller directs HVDC power to either the at least one capacitor and auxiliary battery to trickle charge the at least one capacitor and auxiliary battery.

In another embodiment, the system further includes a low power direct current (LPDC) power source operatively connected to a switching circuit for converting the LPDC power source to a ZNV power source and wherein the ZNV power is operatively connected to the controller.

In another embodiment, the ZNV power source comprises alternate positive and negative voltage pulses of equal but opposite voltages, the system further comprising a data circuit operatively connected to the switching circuit and wherein data within the data circuit is blended to the alternate positive and negative voltage pulses of the ZNV power source as alternating positive and negative voltage pulses having a lower voltage representative of data within the data circuit.

In yet another embodiment, the controller includes a decoding circuit for interpreting the data pulses within the ZNV power source.

In one embodiment, the switching circuit and LVDC power source are operatively connected to a replaceable component connectable to the controller through a detachable electrical interface.

In one embodiment, the detachable electrical interface includes non-moving electrical contacts between the replaceable component and dispenser. In one embodiment, the contacts are moving contacts.

In one embodiment, the auxiliary power cell is a non-rechargeable battery.

In one embodiment, where the replaceable component moves relative to the dispenser during operation and the replaceable component and dispenser collectively, the system includes an energy recapture system operatively connected to the replaceable component and dispenser for capturing kinetic energy within the at least one energy storage system and/or auxiliary power cell.

In another aspect, the invention provides a system for managing power delivery to a dispenser load and for transferring power across an electrical interface between a dispenser and a replaceable component of the dispenser, the system comprising: a replaceable component controller and a first power cell operatively connected to the replaceable component, the replaceable component controller having a power inversion circuit (PIC) for converting direct current power from the first power cell to a zero net voltage (ZNV) power signal; a first circuit operatively connected to the dispenser for receiving the ZNV power signal across the electrical interface, the first circuit for converting the ZNV power signal to higher voltage direct current (HVDC) power; at least one power storage device operatively connected to the first circuit for receiving HVDC power; a second controller operatively connected to the first circuit, at least one power storage device and to a dispenser load, the second controller having: means for selectively directing HVDC power to the at least one power storage device to charge the at least one power storage device; means for selectively directing stored power within the at least one power storage device to the dispenser load.

In this aspect, one embodiments includes an auxiliary power cell operatively connected to the second controller and wherein the second controller has means for selectively directing HVDC power to the auxiliary power cell.

In one embodiment, the at least one power storage device includes a capacitor and where the second controller includes means to prioritize power to the dispenser load from the capacitor ahead of the auxiliary power cell.

In another embodiment, the second controller includes at least one switch operatively connected between the capacitor and auxiliary power cell for selectively directing power to either the capacitor or auxiliary power cell to charge either the capacitor or auxiliary power cell.

In one embodiment, the second controller includes voltage measuring means operatively connected to the capacitor and auxiliary power cell for measuring the voltage of the capacitor and auxiliary power cell and wherein the second controller prioritizes power delivery from the HVDC power source to the capacitor or auxiliary power cell based on actual measured voltage of the capacitor and auxiliary power cell.

In one embodiment, the second controller prioritizes power delivery from the capacitor and auxiliary power cell to the dispenser load based on actual measured voltage of the capacitor and auxiliary power cell.

In one embodiment, when there is no dispenser load demand, the second controller selectively directs HVDC power to one of the capacitor or auxiliary battery to trickle charge the capacitor or auxiliary battery.

In one embodiment, the ZNV power source comprises alternate positive and negative voltage pulses of equal but opposite voltages, the system further comprising a data circuit operatively connected to the replaceable component controller and wherein data from within the data circuit is blended to the alternate positive and negative voltage pulses of the ZNV power source as alternating positive and negative voltage pulses having a lower voltage representative of data within the data circuit.

In one embodiment, the second controller includes a decoding circuit for interpreting the data pulses within the ZNV power source.

In yet another aspect, the invention provides a method of transferring power from a first energy storage system on a replaceable component to a second energy storage system on a second component across a contact interface between the replaceable component and the second component and for managing power on the second component for delivery to an electrical load configured to the second component, the method comprising the steps of: a) inverting direct current from a lower voltage power cell on the replaceable component to a zero net voltage (ZNV) signal; b) transferring the ZNV signal across the contact interface to the second component; c) rectifying the ZNV signal to higher voltage direct current (HVDC) power; d) charging the second energy storage system with the HVDC power and, e) releasing energy from the second energy storage system to the electrical load based on user demand.

In one embodiment, the second energy storage system includes at least one capacitor and a second power cell system and step d includes selectively charging the second power cell system or the second energy storage system.

In one embodiment, step d includes prioritizing charging of the at least capacitor before charging the second power cell system.

In one embodiment, step e includes prioritizing the release of power to the electrical load from the at least one capacitor.

In one embodiment, the ZNV power signal comprises positive and negative voltage pulses of equal but opposite voltages, the method further comprising the step of blending data within the replaceable component into the ZNV power source as alternating positive and negative voltage data pulses having a lower voltage relative to the ZNV voltages and wherein the data pulses are representative of data within the replaceable component.

In one embodiment, the method further includes the step of decoding data within the ZNV power signal within the second component and interpreting that data for assessing if the replaceable component is authorized for use with the second component.

In one embodiment, when the replaceable component moves relative to the second component during operation, the method further comprises the step of recapturing kinetic energy of the replaceable component for use within the second component.

BRIEF DESCRIPTION OF THE DRAWINGS

The invention is described with reference to the accompanying figures in which.

DETAILED DESCRIPTION OF THE INVENTION

With reference to the figures, systems and methods of efficiently transferring power and data between a product pair such as a consumable product cartridge and a dispensing apparatus are described. The systems and methods described provide numerous operational advantages over past systems including minimizing the time required to replace power sources within dispensing equipment. For the purposes of illustration, the invention is described primarily within a paper towel dispensing machine having a replaceable paper cartridge or roll. It is, however, understood that the technology described herein can be applied to a number of different product pairs including soap dispensing equipment and chemical dispensing equipment such as air freshening equipment.

Figure 1:
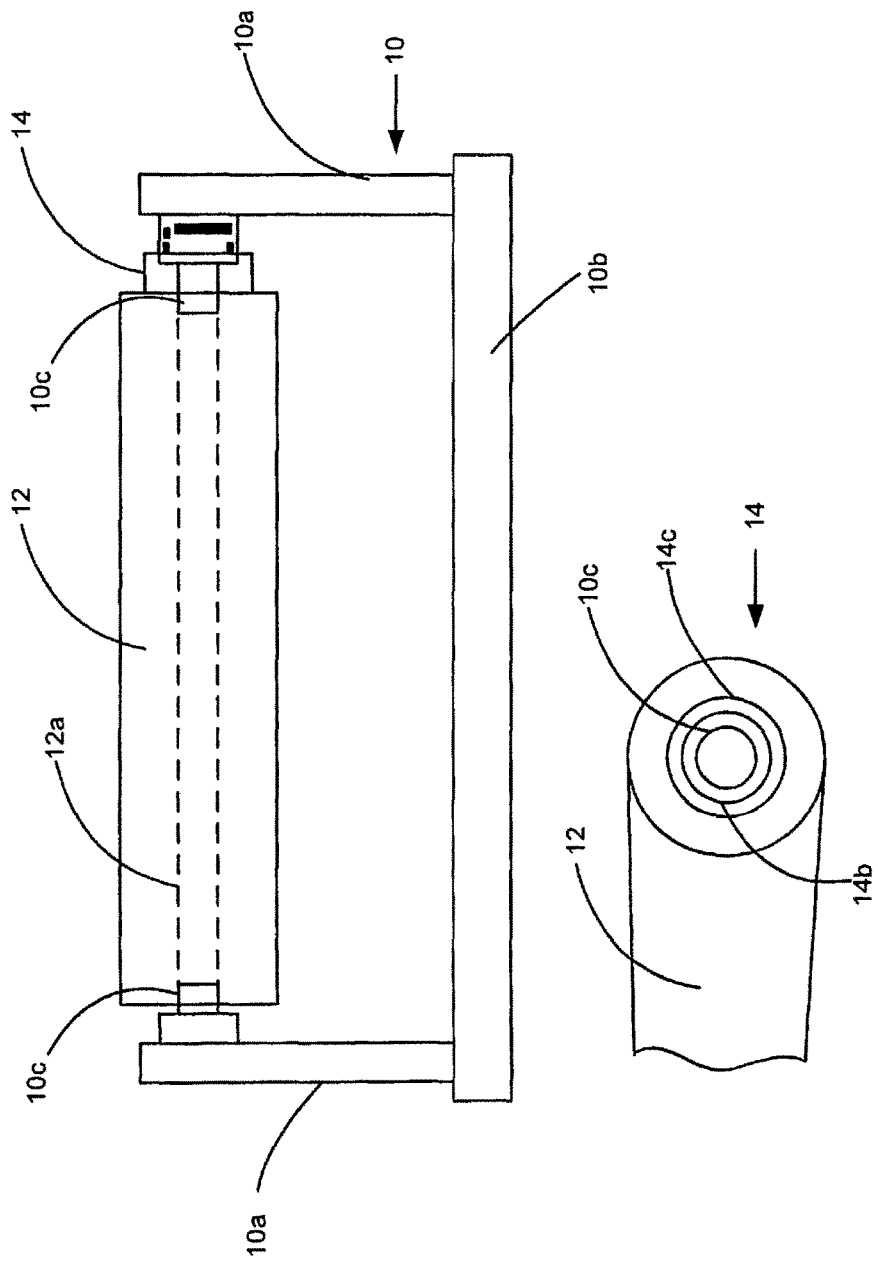
FIG. 1 is a schematic diagram of a paper towel dispenser with an electronic key and power management system in accordance with one embodiment of the invention showing a side and partial end view.

FIG. 1 is a schematic diagram of a paper towel dispenser 10 with a paper towel roll 12 showing various components in accordance with the invention. For the purposes of clarity, the mechanical drive mechanisms and covers that would normally be associated with such a product are omitted. As shown, the paper towel dispenser includes two support arms 10a connected to a base 10b. The arms include supports 10c that engage with the inner surface 12a of paper towel roll 12 and that allow the paper towel roll 12 to rotate about a central axis thereby allowing paper towel to be actively unrolled from the paper towel roll 12 under the action of a motor drive system (not shown) within one of the support arms following a dispensing request from a user.

Electronic Key, Corrosion Free Power Transfer & Dispenser Electronics

Figure 2A:
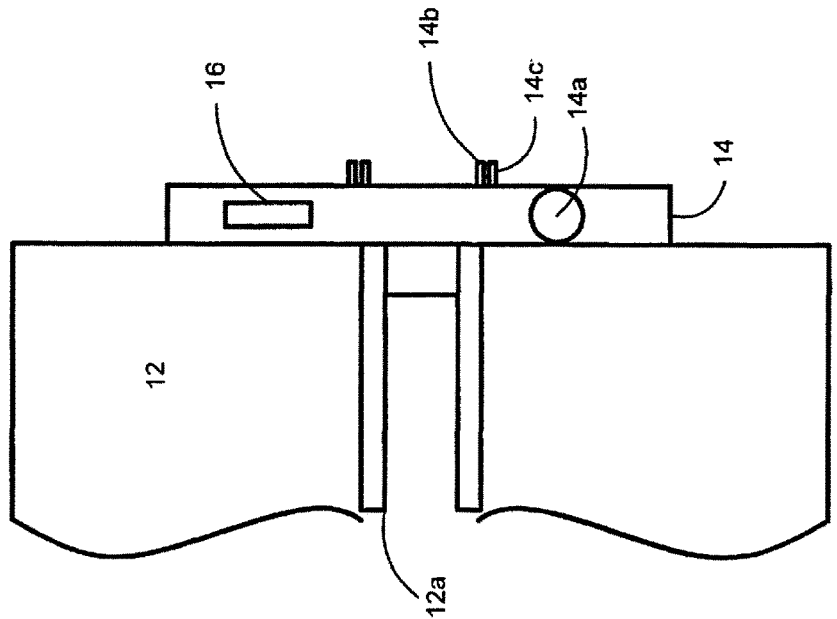
FIG. 2A is a schematic cross-sectional diagram of an electronic key on a paper towel roll in accordance with one embodiment of the invention.
Figure 2:
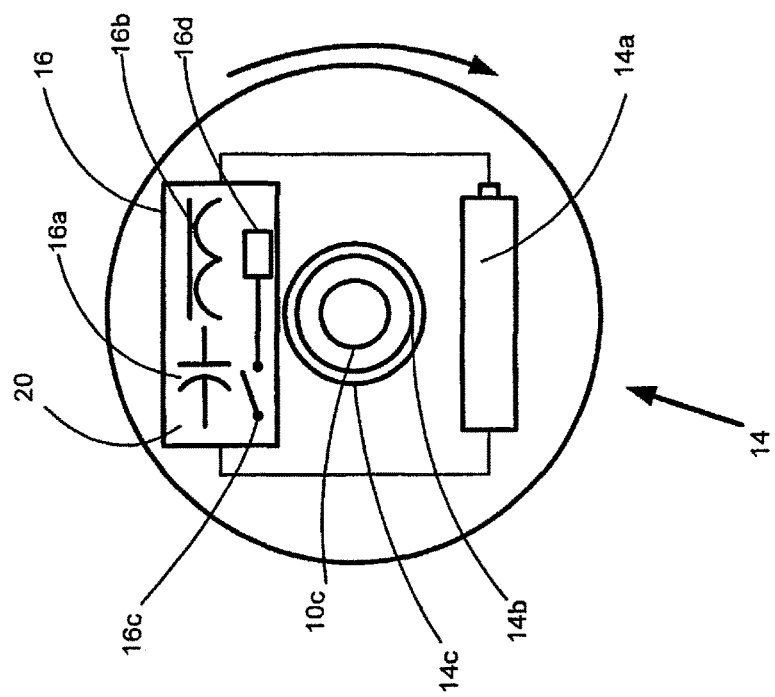
FIG. 2 is a schematic diagram of an electrical key insert in accordance with one embodiment of the invention.

In accordance with the invention, the paper towel roll includes an electronic key system 14 configured to the inner core of one side of the paper towel roll 12. As shown in FIGS. 2 and 2A, the electronic key system 14 includes a power cell 14a, electronic key circuit 16 and electrical contacts 14b, 14c. The electronic key system 14 is preferably locked to the inner surface 12a of the paper towel roll such that the electronic key system cannot be detached from the paper towel roll without damaging or rendering the electronic key circuit inactive. When the paper towel roll 12 is installed within the dispenser 10, in one embodiment, the electronic key system 14 is positioned in operative range of corresponding dispenser electronics 18 (FIG. 3) within the dispenser 10. The electronic key circuit 16 contains inter alia, a capacitor 16a, switch 16c and integrated circuit 16d (eg. ASIC-application specific integrated circuit) the functions of which are described in greater detail below. The electronic key circuit may also contain a coil 16b.

Figure 3:
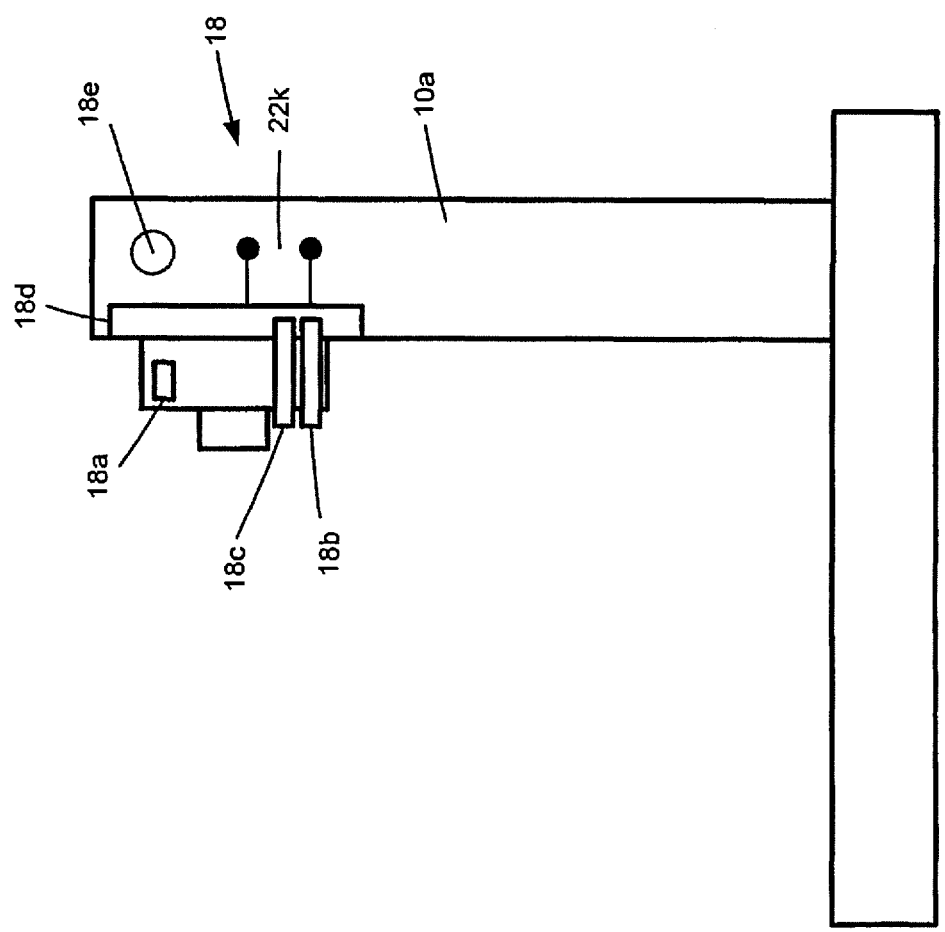
FIG. 3 is a schematic diagram of a connection system in accordance with one embodiment of the invention.

As shown schematically in FIG. 3, the dispenser electronics 18 are configured to one of the dispenser support arms 10a and include electrical contacts 18b, 18c, controller 18d and auxiliary power cell 18e. When the paper towel roll 12 is installed within the dispenser 10, electrical contacts 14b, 14c are contacting the corresponding contacts 18b, 18c. In one embodiment, a permanent magnet 18a is in operative range of the coil 16b.

Key Data and Security

In a preferred embodiment, the electronic key system 14 contains data that permits operation of the consumable with the dispenser. For example, the electronic key system may contain identification data including authenticity data of the consumable product, jurisdictional codes and/or volume, quantity or size codes of the consumable product. The electronic key circuit 16 may also contain a program key that causes the electronic key system 14 to self-deactivate after a volume or quantity of a consumable is depleted and/or information that is received by the dispenser that will advise that the consumable product is depleted, thereby deactivating the electronic key system such that it is not allowed to work in other dispensers.

Corrosion Free Power Transfer & Dispenser Electronics

Generally, once installed, the system enables both power and data to be transferred from the paper towel roll 14 to the dispenser 10 to operate the paper towel roll dispenser as well as provide data, such as authorization data, to the paper towel dispenser.

In accordance with the invention, DC power from the power cell 14a is transferred to the dispenser as a zero net voltage (ZNV) or pulsed signal as shown in FIGS. 6-9 and described in greater detail below. Importantly, the power and data signals from the paper towel roll are transferred across the contacts 14b, 14c, 18b, 18c as alternately positive and negative voltage signals in order to ensure a zero net voltage difference across the electrical contacts during operation. As explained in greater detail below, this is important to ensure that there is no net migration of metal across the corresponding electrical contacts that may otherwise lead to corrosion of the electrical contacts. The ZNV signal can include pulsed DC signals as well as AC signals.

The electronic key circuit 16 of the consumable will include an application specific integrated circuit (ASIC) 16d (or microcontroller or a combination of analog and digital discrete components) that conditions DC power from power cell 14a to create the ZNV signal through a power inversion circuit (PIC). That is, when the dispenser is activated and the dispenser motor is initially turned on, the ASIC 16d creates pulsed wave forms (i.e. having zero net voltage) that allow the transfer of ZNV power from the electronic key circuit to the dispenser. In one embodiment, the ASIC 16d also controls switch 16c that switches the coil into and out of the power circuit. In this case, when the dispenser motor is operating, switch 16c is opened so that the coil 16b is out of circuit when the dispenser motor is operating. Additionally, when the dispenser motor is turned off, the ASIC 16d can switch the coil into circuit such that rotational energy from the decelerating paper towel roll is captured for storage in the capacitor 16a for use. The ASIC 16d can monitor the current draw from the power cell 14a or utilize another signal mechanism such as an accelerometer (not shown) as the signal to open or close switch 16c. That is, if current is being drawn thereby signaling that the dispenser motor is running, then the switch 16c will be opened. In one embodiment, as current draw reduces thereby signaling that the dispenser motor is off, switch 16*c*, will be closed. Importantly, switch 16*c* is open when the motor is operating so that the coil is not working against the magnet. It should be noted that the coil 16*b*, switch 16*c* and capacitor 16*a* are not essential to the invention and can implemented as an additional system by which kinetic energy may be recovered if practical or desirable for a particular system.

The ASIC 16*d* may also contain the security features as described above.

Figure 4:
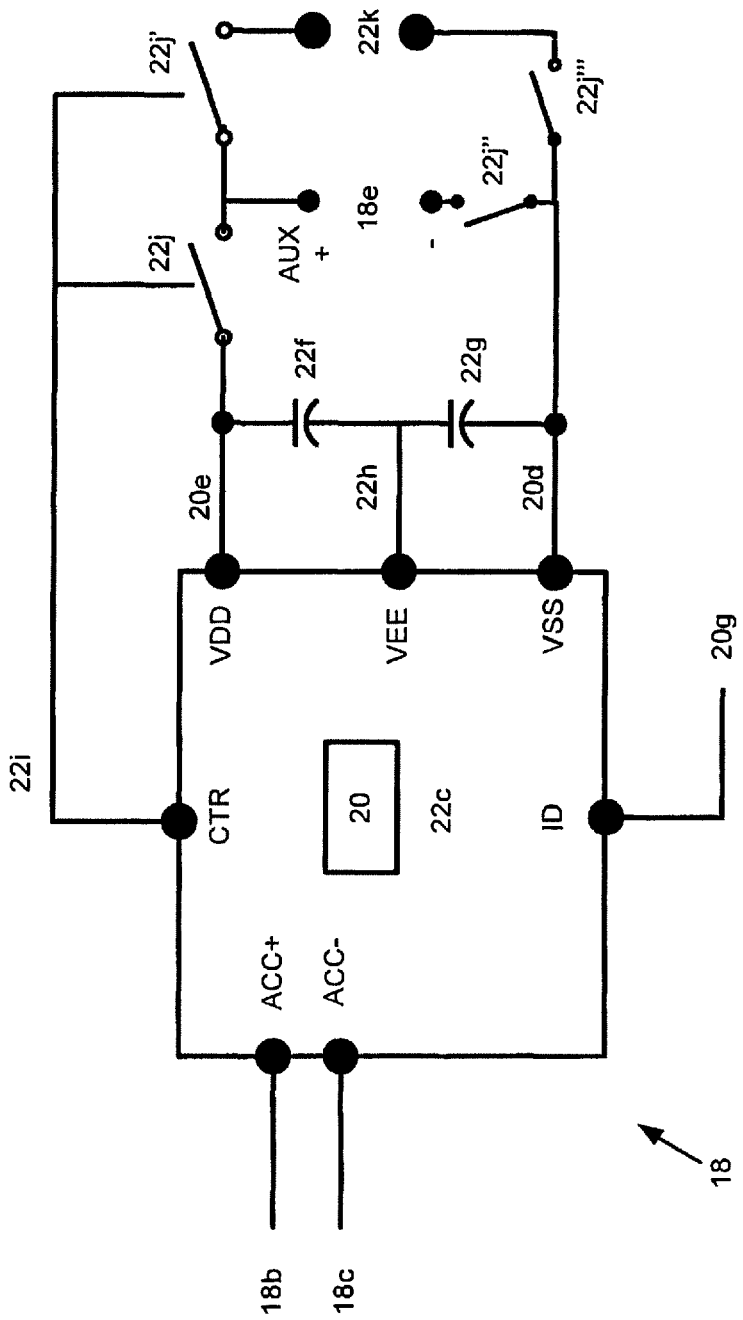
FIG. 4 is a schematic diagram of a rectification and IO decode circuit in accordance with one embodiment of the invention.
Figure 5:
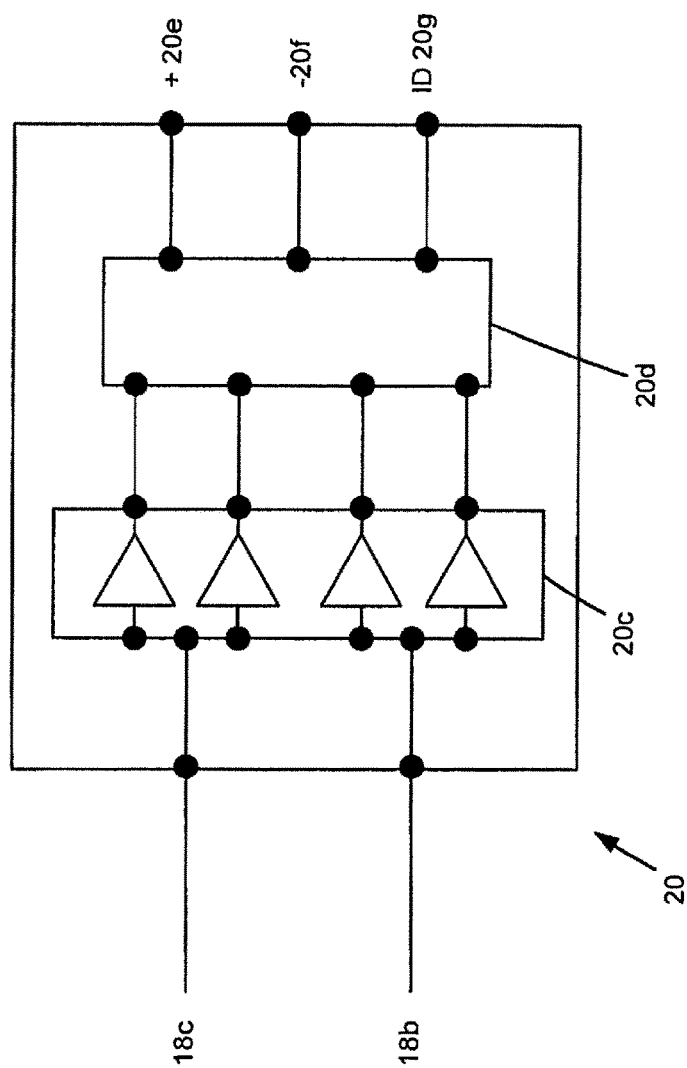
FIG. 5 is a schematic diagram of a control logic circuit for driving a load in accordance with one embodiment of the invention.

With reference to FIGS. 3-5, the interaction and design of the electronic key system 14 with the dispenser electronics 18 and the design of the dispenser circuits are described. Importantly, the combined electronic key system 14 and dispenser electronics 18 enable a) power from a consumable product to be transferred to a dispenser and b) simultaneously transfer an ID or data signal between the two components. Importantly, the combined system does so reliably over extended time periods while reducing or eliminating corrosion of the electrical contacts between the components. In addition, the power and ID signals are transferred quickly so as to not cause delays to a user interacting with the system while also providing effective data communication between the electronic key and the dispenser to prevent for example, unauthorized consumables being dispensed from the dispenser.

Further still, the system provides power management functionality that enables efficient transfer of power between power cells where a relatively low power density within a consumable power cell is effective in efficiently providing power to a dispenser circuit that has an intermittent but higher power density demand than what the consumable power cell is capable of instantaneously providing. In one embodiment, the system also allows kinetic energy within the system to be recaptured.

As shown schematically in FIG. 3, a dispenser having a dispenser arm 10*a* contains dispenser circuit 18 with controller 18*d*. The dispenser circuit includes electrical contacts 18*b* and 18*c* that contact electronic key contacts 14*b*, 14*c*. The dispenser circuit 18 also includes an auxiliary power cell 18*e* and a permanent magnet 18*a* positioned so as to interact with the electronic key coil 16*b* (optional). As explained in greater detail below, these components interact to enable the efficient management of power and information within the system.

Energy Management System

Generally, the energy management system (EMS) is designed to effectively manage available power in the system. More specifically, the EMS allows:

a) low-voltage, low current power that may be available within one or multiple power cells on a replaceable component to be stepped up for use in a higher voltage, higher current application such as a dispensing motor;

b) low-voltage, low current power to be used for charging a distinct power storage device;

c) capturing kinetic energy from within a dispensing system for enhancing the overall efficiency and/or life of a dispensing system; and, d) decoding and separating an ID signal from the power signal.

FIG. 4 shows one embodiment of the dispenser circuit 18 and FIG. 5 shows a rectification and decoding controller (RDC) 20 within the dispenser circuit. Specifically, FIG. 4 shows a controller 18 (having for example, an application specific integrated circuit (ASIC), microcontroller or a combination of analog and digital discrete components). In the embodiment described herein, pulsed power provided by the power cell 14*a*, passes through wires 18*b*, 18*c* to controller 18. Within this description an ASIC is described in which the pulsed signals arrive at 18*b*, 18*c*. From the pulsed signal, the ID signal is decoded and sent via output 20*g* to the ASIC or to a separate circuit (not shown) for interpretation. After rectification, output power is provided through 20*d*, 20*e* and may be stored in capacitors 22*f*, 22*g*, used to power load 22*k* or recharge auxiliary power cell 18*e*. The voltage step-up may be for example, 2-4 times the voltage of power cell 14*a*.

In this case, the ASIC will determine if the power is required to charge the capacitors or to recharge the auxiliary battery. The control of charging and releasing of power from the capacitors and auxiliary power cell 18*e* is controlled by input signal 22*i* of the ASIC on switches 22*j*, 22*j'*, 22*j"*, and 22*j'''*. For example, if energy is available and there is no demand for power, switches 22*j*, 22*j'*, 22*j"* and 22*j'''* are opened in order to charge the capacitors. If the capacitors are charged, power is available and the auxiliary power cell requires power, switches 22*j* and 22*j"* are closed and switches 22*j'* and 22*j'''* are open to direct power to the capacitors and to auxiliary power cell. If a signal is received to direct power to the load 22*k*, switches 22*j*, 22*j'* and 22*j'''* are closed and switch 22*j"* is opened such that power is preferentially drawn from the capacitors.

The degree of charge of the capacitors is measured by the ASIC measuring the voltage of the capacitors through 22*h*. That is, in order to make a decision regarding the position of switches 22*j*, 22*j'*, 22*j"*, and 22*j'''* the ASIC samples the voltage across the capacitors and auxiliary power cell. If the voltage of the capacitors is greater than the auxiliary power cell 18*e*, the switches are appropriately positioned and power is routed from the storage capacitors to the load. If the voltage across the capacitors is less than the power cell 18*e*, the power is routed via the power cell 18*e*. As such, this functionality ensures that power is always available to power the load, thus preventing delays in activation that can be annoying to users. Furthermore, the combined controller 18 and rectification and decoding circuit 20 (described below) allows the low current, low voltage power of the consumable battery to be utilized to trickle charge the capacitors while there is no load demand or provide charging power. It should also be noted that the foregoing is one example of the design of the energy management system and that modifications in the general design may be made as understood by those skilled in the art.

Rectification, and Decoding Circuit

Turning to FIG. 5, FIG. 5 shows a rectification and decoding controller (RDC) 20 within the dispenser controller 18. As shown, the RDC includes a rectification circuit 20*c* and ID decoder 20*d*. The pulsed power signal, ID signals and coil pulses pass into the RDC through 18*b* & 18*c*. The rectifier 20*c* may be a high efficiency MOSFET switching type or similar device. The rectifier 20*c* converts the pulsed signals into a steady state DC voltage and current. For example, a 3 volt, 50 mA current signal may be input into the RDC 20 which provides a 6 volt, 23 mA output (at an approximate 90% conversion efficiency) through 20*e*, 20*f*. It should be noted that additional power conditioning can be conducted to either increase or decrease the voltage and current capacity as may be designed for a specific system.

Furthermore, as noted above, the dispenser circuit 18 will draw upon the auxiliary power cell 18*e* if the capacitor voltage of the capacitors 22*f* and 22*g* is not sufficient to activate the load 22*k*. For example, if the dispenser receives numerous dispensing requests in a short time period, the capacitors may not have sufficient time to recharge given the power delivery rate from power cell 14*a*. Thus, the dispenser circuit 18 may draw upon power from the auxiliary power cell 18e. The power cell 18e may be a rechargeable battery in which case, when the system is inactive, in addition to recharging the capacitors, the auxiliary power cell may be trickled charged from power from the power cell 14a. However, the auxiliary power cell 18e may also be a non-rechargeable battery in which case the controller 20 would operate switches only to enable the delivery of power from the auxiliary power cell 18e.

Preferably, the auxiliary power cell will not need replacement during the life of the dispenser as it will remain fully charged at the time the consumable product is replaced. However, there are scenarios in which all the power from the power cell 14a would not be fully transferred to the auxiliary power cell at the time the consumable product is replaced. For example, if there are multiple dispensing requests in a short time period shortly before the consumable product is fully depleted and the consumable product is replaced almost immediately upon depletion, there may not have been enough time to fully recharge the auxiliary power cell 18e. However, in order to account for this scenario, the power cell 14a within each consumable product will preferably have a small amount of reserve power that will enable the auxiliary power cell to be fully charged after a new consumable product is placed within the system.

As noted, the decoder circuit extracts and interprets the digital information from the electronic key and outputs via 20g. The ID signals may be used for a number of potential uses such as ensuring the correct towel or soap type is installed, ensuring expiration date of consumable has not passed, as well as other functions described above.

The overall efficiency of the power transfer from the power cell 14a to the load is preferably greater than 90%.
Energy Recovery In one embodiment, as the paper towel roll rotates past the permanent magnet 18a as it is slowing down after a dispense cycle, switch 16c is closed such that an electrical impulse is created within the electronic key circuit 16 which is stored in capacitor 16a. For example, when the voltage in the capacitor 16c is sufficiently high as a result of repeated cycles, the ASIC 16d may make available that stored power for use in transferring power to the dispenser. Thus, in this embodiment, the system allows the kinetic energy contained within the momentum of a rotating paper towel roll to be recaptured as the paper roll slows down after a dispensing cycle as the magnet and coil continue to interact.

Figure 6:
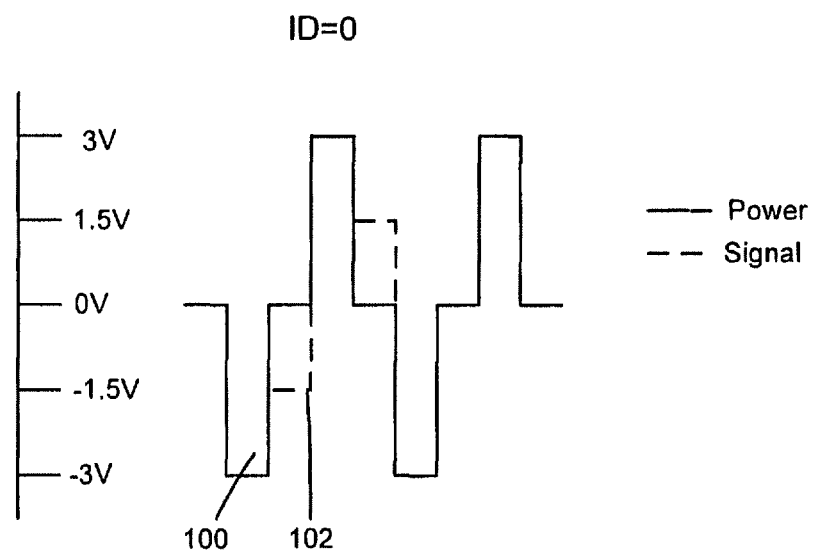
FIGS. 6 and 6A are representative output signals from a consumable cartridge in accordance with one embodiment of the invention showing an ID=0 signal.
Figure 6A:
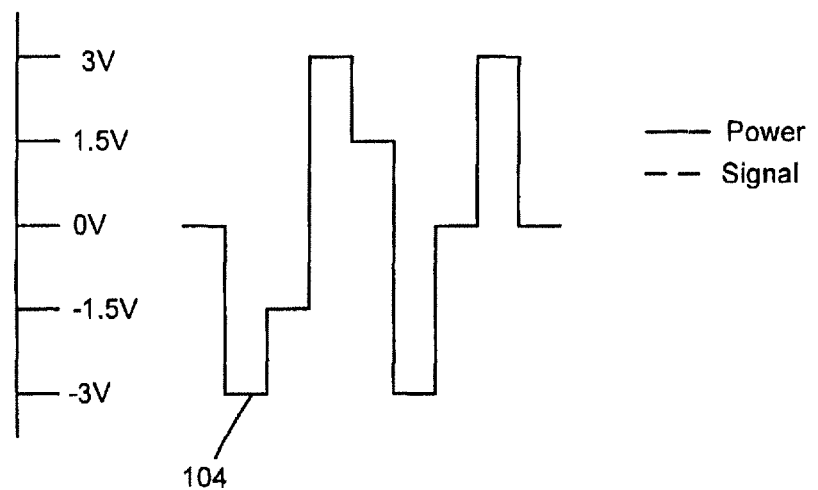

Similarly, the EMS may also include motor braking within the dispenser that may also recapture the momentum of the dispenser motor system for storage within an energy storage system. Depending on the gearing of the system, a coil may pass a magnet several times during slow down which over time can return a meaningful quantity of power back to the system. In both cases, a small but significant amount of power over the lifetime of the dispenser can be recaptured that improves the overall efficiency of the dispensing system and that in totality can be used to substantially eliminate or reduce the need for replacing dispenser batteries.
Corrosion Prevention As shown in FIGS. 6-10, representative signal patterns are described. FIGS. 6 and 6A show two distinct signals produced by circuit 16 including a power signal 100 and ID signal 102. The power signal 100 transfers power from the electronic key 14 power cell 14a to the dispenser circuit 18 and the ID signal 102 transfer data from the electronic key to the dispenser circuit 18. Power signals 100 are alternately positive and negative voltage such that power is transferred with a net zero electrical charge as shown in FIG. 10. ID signals 102 are also alternately positive and negative voltage signals where the order of the positive and negative signals can be interpreted as either a 0 or 1.

Figure 7:
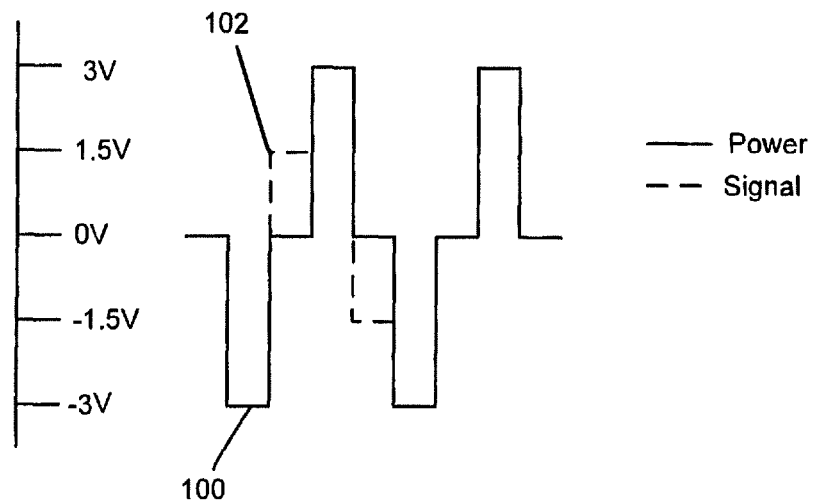
FIGS. 7 and 7A are representative output signals from a consumable cartridge in accordance with one embodiment of the invention showing an ID=1 signal.
Figure 7A:
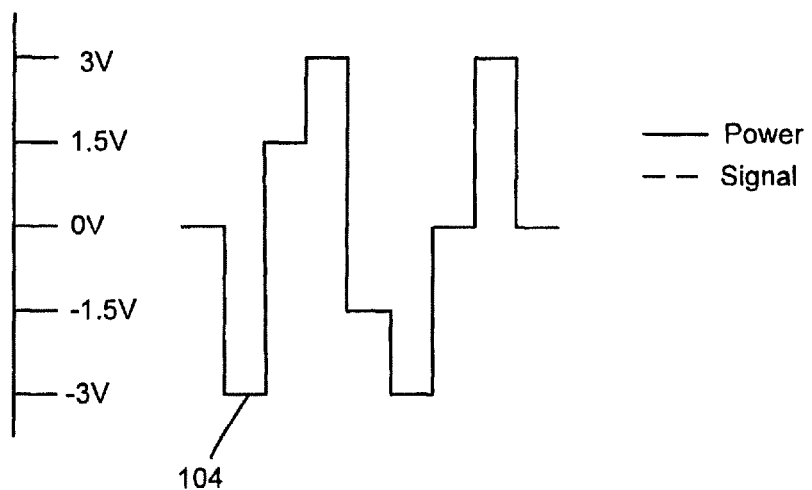

More specifically, as shown in FIGS. 6, 6A, 7 and 7A, the power signals are shown in solid lines as a square waves where ID signals 102 are shown in dotted lines at a time separation between each power signal. As shown in FIG. 6, an ID signal representing a 0 can be represented by a negative ID signal followed by a positive ID signal whereas, as shown in FIG. 7, a 1 can be represented by a positive ID signal followed by a negative ID signal. The wave output of the combined signals is shown in FIGS. 6A and 7A as signal 104.

Figure 8:
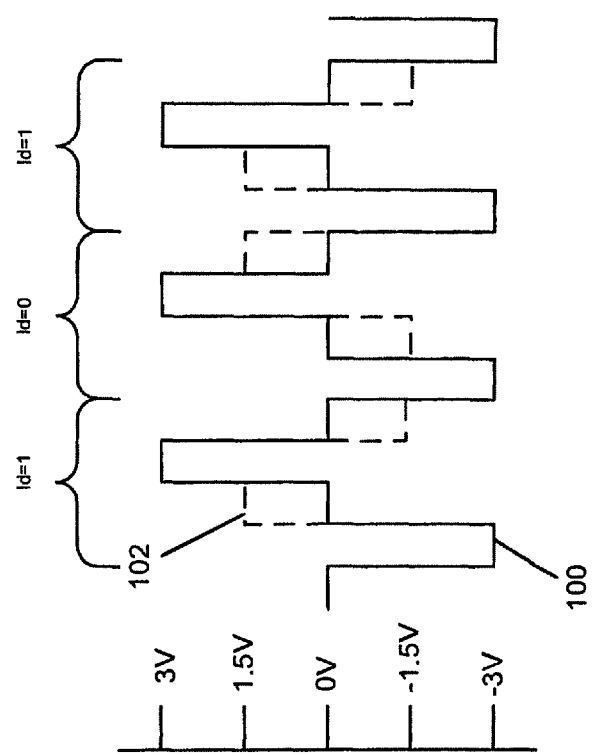
FIGS. 8 and 9 are representative output signals from a consumable cartridge in accordance with one embodiment of the invention showing a 1,0,1 signal sequence; and, FIG. 10 shows a net charge balance for the signal sequence shown in FIGS. 8 and 9.
Figure 9:
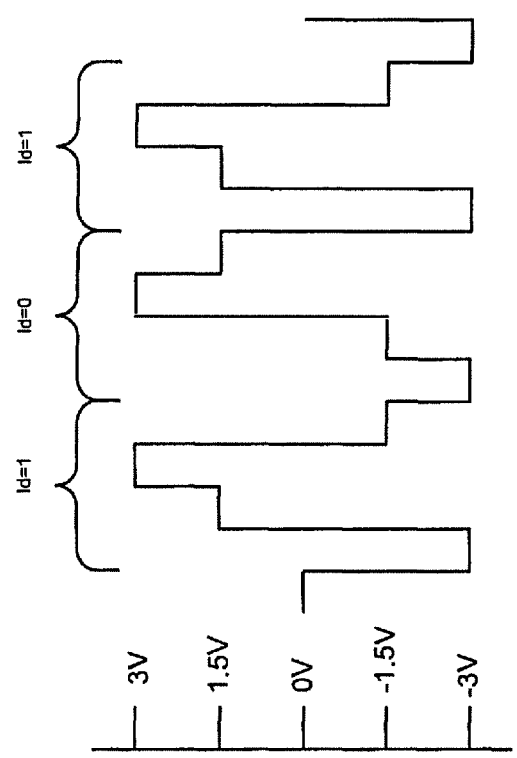
Figure 10:
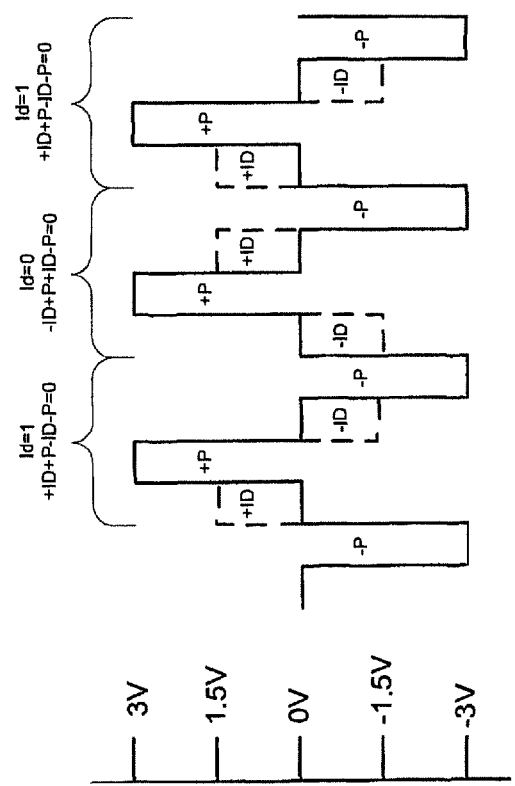

FIGS. 8 and 9 show a representative signal of a 1,0,1 ID sequence and FIG. 10 shows that the total net charge for a combined power and ID sequence is zero. The effect of a net total charge during power and ID transfer prevents metal migration and corrosion across the electrical contacts such that the system will realize very effective power and signal transfer over a longer time frame. This is particularly significant for the life of the dispenser as the electrical contacts of the dispenser are not replaced when the consumable product is replaced.

It is important to note that the foregoing description is illustrative only and it is understood that power and ID signals can be transmitted using different voltages and/or signal patterns as understood by those skilled in the art.
Other Consumable Product and Dispensers The foregoing may be implemented in other types of dispensing systems including liquid dispensers (eg. soap dispensers) or chemical dispensers (eg. aerosol fragrance dispensers, or chemical maintenance dispensing). In these embodiments, the electronic key will be configured to the consumable product, for example a bag of liquid soap with an electronic key designed for operative connection to dispenser electronics. In this case, the contacts between the consumable product and dispenser will not require contacts that move relative to one another systems and would generally not include energy recapture systems as described above.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A system for managing power delivery to a dispenser, the system comprising:
   a controller operatively connected to a lower power zero net voltage (ZNV) power source, the controller having a power rectification circuit (PRC) for converting the ZNV power source to a higher voltage direct current (HVDC) power source;
   at least one energy storage system operatively connected to the HVDC power source for receiving and storing HVDC power within the at least one energy storage system; and
   a dispenser load operatively connected to the at least one energy storage system;
   a low power direct current (LPDC) power source operatively connected to a switching circuit for converting the LPDC power source to a ZNV power source and wherein the ZNV power is operatively connected to the controller; and a data circuit operatively connected to the switching circuit;

wherein the ZNV power source comprises alternate positive and negative voltage pulses of equal but opposite voltages and wherein data within the data circuit is blended to the alternate positive and negative voltage pulses of the ZNV power source as alternating positive and negative voltage data pulses having a lower voltage representative of data within the data circuit.

2. The system as in claim 1 wherein the controller is configured to selectively direct HVDC power to the at least one energy storage system to charge the at least one energy storage system and to selectively direct power from the at least one energy storage system to the dispenser load based on load demand.

3. The system as in claim 1 wherein the energy storage system includes at least one capacitor.

4. The system as in claim 3 further comprising an auxiliary power cell operatively connected to the HVDC power source for receiving and storing HVDC power within the auxiliary power cell and wherein the controller is configured to selectively direct HVDC power to each of the at least one capacitor and auxiliary power cell to charge the at least one capacitor and auxiliary power cell and to selectively direct power from the at least one capacitor and auxiliary power cell to the dispenser load based on load demand.

5. The system as in claim 4, where the controller prioritizes power to the dispenser load from the at least one capacitor ahead of the auxiliary power cell.

6. The system as in claim 4 where the auxiliary power cell is a non-rechargeable battery.

7. The system as in claim 3 wherein the controller includes at least one switch operatively connected between the at least one capacitor and auxiliary power cell for selectively directing power to either the at least one capacitor or auxiliary power cell to charge either the at least one capacitor or auxiliary power cell.

8. The system as in claim 7 wherein the controller includes voltage measuring circuitry operatively connected to the at least one capacitor and auxiliary power cell for measuring the voltage of the at least one capacitor and auxiliary power cell and wherein the controller prioritizes power delivery from the HVDC power source to the at least one capacitor or auxiliary power cell based on actual measured voltage of the at least one capacitor and auxiliary power cell.

9. The system as in claim 8 wherein the controller prioritizes power delivery from the at least one capacitor and auxiliary power cell to the dispenser load based on actual measured voltage of the at least one capacitor and auxiliary power cell.

10. The system as in claim 3 wherein when there is no dispenser load demand, the controller directs HVDC power to either the at least one capacitor and auxiliary battery to trickle charge the at least one capacitor and auxiliary battery.

11. The system as in claim 1 wherein the controller includes a decoding circuit for interpreting the data pulses within the ZNV power source.

12. The system as in claim 1 where the switching circuit and LVDC power source are operatively connected to a replaceable component connectable to the controller through a detachable electrical interface.

13. The system as in claim 12 where the detachable electrical interface includes non-moving electrical contacts between the replaceable component and dispenser.

14. The system as in claim 12 where the detachable electrical interface includes moving contacts between the consumable and dispenser.

15. The system as in claim 12 wherein the replaceable component moves relative to the dispenser during operation and the replaceable component and dispenser collectively include an energy recapture system operatively connected to the replaceable component and dispenser for capturing kinetic energy within the at least one energy storage system and/or auxiliary power cell.

16. A method of transferring power from a first energy storage system in a replaceable component to a second energy storage system in a second component across a contact interface between the replaceable component and the second component and for managing power in the second component for delivery to an electrical load configured to the second component, the method comprising the steps of:
  a. inverting direct current from the first energy storage system in the replaceable component to a zero net voltage (ZNV) signal, the first energy storage system having a low power direct current (LPDC) power source that is operatively connected to a switching circuit for converting the direct current to the ZNV signal, the switching circuit being operatively connected to a data circuit;
  b. transferring the ZNV signal across the contact interface to the second component;
  c. rectifying the ZNV signal to higher voltage direct current (HVDC) power using a controller, the controller receiving the ZNV signal and having a power rectification circuit (PRC) for converting the ZNV signal to the HVDC power;
  d. charging the second energy storage system with the HVDC power for storing the HVDC power within the second energy storage system; and
  e. releasing energy from the second energy storage system to the electrical load based on user demand, the electrical load being operatively connected to the second energy storage system;

wherein the ZNV signal comprises alternate positive and negative voltage pulses of equal but opposite voltages, wherein the method further comprises the step of blending data within the data circuit into the ZNV signal as alternating positive and negative voltage data pulses which have a lower voltage relative to the alternate positive and negative voltage pulses, and wherein the data pulses are representative of data within the replaceable component.

17. The method as in claim 16 wherein the second energy storage system includes at least one capacitor and a second power cell system and step d includes selectively charging the at least one capacitor or the second power cell system.

18. The method as in claim 17 wherein step d includes prioritizing charging of the at least capacitor before charging the second power cell system.

19. The method as in claim 18 wherein step e includes prioritizing the release of power to the electrical load from the at least one capacitor.

20. The method as in claim 16 further comprising the step of decoding data within the ZNV power signal within the second component and interpreting that data for assessing if the replaceable component is authorized for use with the second component.

21. The method as in claim 16 wherein when the replaceable component moves relative to the second component during operation, the method further comprises the step of recapturing kinetic energy of the replaceable component for use within the second component.

\* \* \* \* \*